United States Patent
Lu et al.

(10) Patent No.: US 8,369,814 B2
(45) Date of Patent: Feb. 5, 2013

(54) MOBILE COMMUNICATION DEVICE AND RECEPTION SUPPRESSING METHOD

(75) Inventors: Ting Lu, Kanagawa (JP); Kenji Waku, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 233 days.

(21) Appl. No.: 12/745,376

(22) PCT Filed: Nov. 28, 2008

(86) PCT No.: PCT/JP2008/071618
§ 371 (c)(1),
(2), (4) Date: May 28, 2010

(87) PCT Pub. No.: WO2009/069730
PCT Pub. Date: Jun. 4, 2009

(65) Prior Publication Data
US 2010/0304692 A1    Dec. 2, 2010

(30) Foreign Application Priority Data

Nov. 29, 2007   (JP) .................................. 2007-309134
Jul. 30, 2008    (JP) .................................. 2008-196729

(51) Int. Cl.
*H04B 1/10* (2006.01)
(52) U.S. Cl. ..................................... 455/296; 455/226.1
(58) Field of Classification Search .......... 455/296–307, 455/226.1–226.4, 67.11–67.14, 63.1–63.4
See application file for complete search history.

(56) References Cited

U.S. PATENT DOCUMENTS

| | | | |
|---|---|---|---|
| 7,715,891 B2 * | 5/2010 | Fujita et al. ................ | 455/67.14 |
| 8,185,061 B2 * | 5/2012 | Sato et al. ..................... | 455/63.3 |
| 2009/0131129 A1 * | 5/2009 | Yamazaki et al. ............ | 455/296 |
| 2011/0002427 A1 * | 1/2011 | Hamamoto ................... | 455/303 |
| 2011/0319046 A1 * | 12/2011 | Lackey ........................ | 455/307 |

FOREIGN PATENT DOCUMENTS

| | | |
|---|---|---|
| JP | 2002-076982 A | 3/2002 |
| JP | 2004-080199 | 3/2004 |
| JP | 2006-217127 | 8/2006 |
| JP | 2006-261998 | 9/2006 |
| JP | 2007-104495 | 4/2007 |
| JP | 2007-143031 | 6/2007 |
| WO | 2006/030708 A1 | 3/2006 |

OTHER PUBLICATIONS

Notice of Reasons for Rejection dated Sep. 13, 2011, issued for counterpart Japanese Application No. 2009-543862.
Decision of Rejection dated May 15, 2012, issued in counterpart Japanese Application No. 2009-543862.

* cited by examiner

*Primary Examiner* — Lana N Le
(74) *Attorney, Agent, or Firm* — Procopio, Cory, Hargreaves & Savitch LLP

(57) ABSTRACT

It is an objective of the present invention to provide a mobile communication device and a reception suppressing method which can preferably perform communication even if a plurality of antennas is provided and a frequency bandwidth of a transmission signal or a reception signal of each antenna is in a close range with each other.

6 Claims, 11 Drawing Sheets

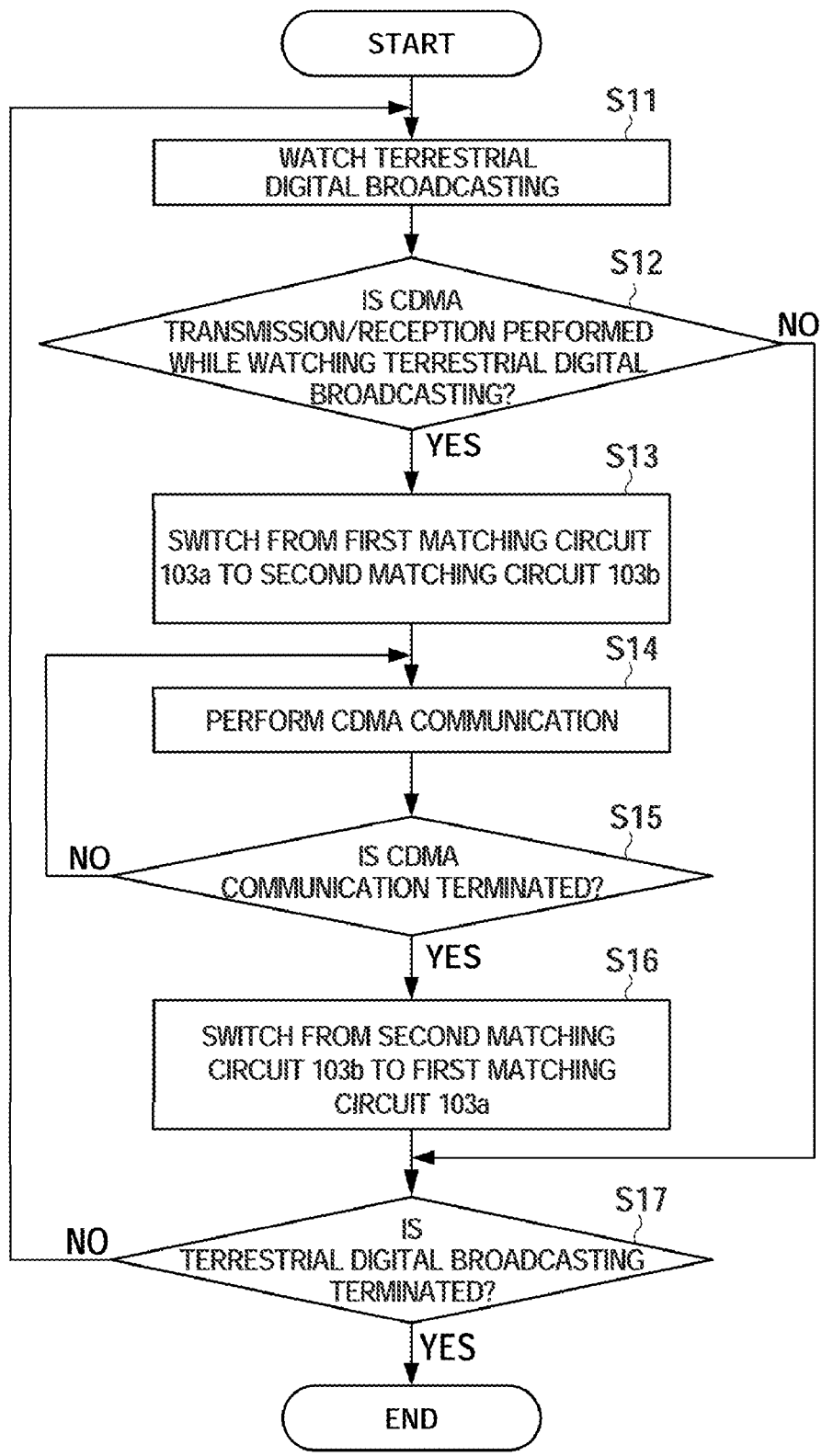

MOBILE COMMUNICATION DEVICE AND RECEPTION SUPPRESSING METHOD

TECHNICAL FIELD

The present invention relates to a mobile communication device having a plurality of antennas and to a reception suppressing method.

BACKGROUND ART

In Japan, it is planned to completely shift television broadcasting to terrestrial digital broadcasting. A feature of the terrestrial digital broadcasting is simple motion picture broadcasting for a mobile terminal device. The simple motion picture broadcasting delivers an image via one particular segment among 13 segments divided from a band of one channel (6 MHz) assigned to each broadcasting station.

At present, cellular telephone devices and the like, which are equipped with features (compatible antenna, tuner, signal processing unit, etc.) compatible with such terrestrial digital broadcasting, and which are capable of playing a variety of information received from the terrestrial digital broadcasting, are being introduced.

Here, such a cellular telephone device equipped with a function to receive the terrestrial digital broadcasting is designed such that, while television broadcasting is being received and watched via an antenna for receiving the terrestrial digital broadcasting, communication (for example, data communication by a CDMA (code division multiple access) method) can be performed via another antenna at the same time.

Moreover, a UHF band of 470 MHz to 770 MHz is assigned as a frequency bandwidth of the terrestrial digital broadcasting; on the other hand, a frequency bandwidth to a higher frequency side than the frequency bandwidth of the terrestrial digital broadcasting is assigned as a transmission/reception frequency bandwidth of the data communication by the CDMA method.

Incidentally, in a case in which the high frequency band (770 MHz) of the terrestrial digital broadcasting and the low frequency band of the CDMA communication method fall within a certain range, and when data is transmitted and received by the CDMA communication method while watching the terrestrial digital broadcasting, a signal of the CDMA communication method may work as an interfering wave, thereby making it difficult to watch the terrestrial digital broadcasting in some cases. Alternatively, conversely, a broadcast signal of the terrestrial digital broadcasting may work as an interfering wave, thereby making it difficult to perform data communication by the CDMA communication method in some cases.

Here, in Patent Document 1, by designing a frequency bandwidth of the terrestrial digital broadcasting to be narrow, only a desired channel signal is extracted, the reception sensitivity is improved, and it is not affected by a frequency band of another antenna; and it is conceivable, for example, to utilize such a technique in a case in which data communication is performed by the CDMA method while receiving the terrestrial digital broadcasting.

Patent Publication 1: Japanese Unexamined Patent Application, First Publication No. 2007-104495

DISCLOSURE OF THE INVENTION

Problems to be Solved by the Invention

However, in such a case in which a plurality of antennas is provided, and a low frequency bandwidth of a transmission signal or a reception signal of each antenna is in a close range with each other, interference between the signals occurs, and thus causing an adverse effect on communication.

The present invention has been made in view of the problem as described above, and an object of the present invention is to provide a mobile communication device and a reception suppressing method which can preferably perform communication even if a plurality of antennas is provided and a frequency bandwidth of a transmission signal or a reception signal of each antenna is in a close range with each other.

Means for Solving the Problems

In order to solve the aforementioned problem, a mobile communication device according to the present invention is characterized by including: a first signal processing means for performing predetermined signal processing on a transmission signal transmitted via a first antenna or a reception signal received via the first antenna; a second signal processing means for performing predetermined signal processing on a transmission signal transmitted via a second antenna or a reception signal received via the second antenna; and a reception suppressing means for suppressing the transmission signal transmitted via the second antenna or the reception signal received via the second antenna from being received via the first antenna, while at least one of the predetermined signal processing by the first signal processing means and the predetermined signal processing by the second signal processing means is being performed.

Moreover, in the mobile communication device, it is preferable that the reception suppressing means performs adjustment such that a resonance frequency of the first antenna is shifted away from a frequency of the transmission signal transmitted via the second antenna or a frequency of the reception signal received via the second antenna, thereby suppressing the transmission signal transmitted via the second antenna or the reception signal received via the second antenna from being received via the first antenna, while at least one of the predetermined signal processing by the first signal processing means and the predetermined signal processing by the second signal processing means is being performed.

In addition, in the mobile communication device, it is preferable that, in a case in which a frequency of the transmission signal transmitted via the first antenna or a frequency of the reception signal received via the first antenna is a frequency that is closer to a frequency of the transmission signal transmitted via the second antenna or a frequency of the reception signal received via the second antenna as compared to a predetermined frequency defined in advance, the reception suppressing means performs adjustment such that the resonance frequency of the first antenna is shifted away from the frequency of the transmission signal transmitted via the second antenna or the frequency of the reception signal received via the second antenna, thereby suppressing the transmission signal transmitted via the second antenna or the reception signal received via the second antenna from being received via the first antenna.

Furthermore, in the mobile communication device, it is preferable that, in a case in which intensity of a transmission signal transmitted via the second antenna or intensity of a reception signal received via the second antenna is higher than a predetermined intensity defined in advance, the reception suppressing means performs adjustment such that the resonance frequency of the first antenna is shifted away from the frequency of the transmission signal transmitted via the second antenna or the frequency of the reception signal received via the second antenna, thereby suppressing the transmission signal transmitted via the second antenna or the reception signal received via the second antenna from being received via the first antenna.

Moreover, in the mobile communication device, it is preferable that, in a case in which the signal processing by the second signal processing means is terminated after performing the adjustment such that the resonance frequency of the first antenna is shifted away from the frequency of the transmission signal transmitted via the second antenna or the frequency of the reception signal received via the second antenna, the reception suppressing means returns the resonance frequency of the first antenna to a state before the adjustment.

In addition, in the mobile communication device, it is preferable that, while at least one of the predetermined signal processing by the first signal processing means and the predetermined signal processing by the second signal processing means is being performed, the reception suppressing means narrows a bandwidth of a resonance frequency of the first antenna, thereby suppressing the transmission signal transmitted via the second antenna or the reception signal received via the second antenna from being received via the first antenna.

Furthermore, in the mobile communication device, it is preferable that, in a case in which a frequency of the transmission signal transmitted via the first antenna or a frequency of the reception signal received via the first antenna is a frequency that is closer to a frequency of the transmission signal transmitted via the second antenna or a frequency of the reception signal received via the second antenna as compared to a predetermined frequency defined in advance, the reception suppressing means narrows the bandwidth of the resonance frequency of the first antenna, thereby suppressing the transmission signal transmitted via the second antenna or the reception signal received via the second antenna from being received via the first antenna.

Moreover, in the mobile communication device, it is preferable that, in a case in which intensity of a transmission signal transmitted via the second antenna or intensity of a reception signal received via the second antenna is higher than a predetermined intensity defined in advance, the reception suppressing means narrows the bandwidth of the resonance frequency of the first antenna, thereby suppressing the transmission signal transmitted via the second antenna or the reception signal received via the second antenna from being received via the first antenna.

In addition, in the mobile communication device, it is preferable that, in a case in which the predetermined signal processing by the second signal processing means has been terminated after the reception suppressing means narrows the bandwidth of the resonance frequency of the first antenna while at least one of the predetermined signal processing by the first signal processing means and the predetermined signal processing by the second signal processing means is being performed, the reception suppressing means returns the bandwidth of the resonance frequency of the first antenna to a state before being narrowed to a certain width.

Furthermore, it is preferable that the mobile communication device includes an operation detecting means for detecting an operation, in a case in which an operation has been detected by the operation detecting means while at least one of the predetermined signal processing by the first signal processing means and the predetermined signal processing by the second signal processing means is being performed, the reception suppressing means suppresses the transmission signal transmitted via the second antenna or the reception signal received via the second antenna from being received via the first antenna and shifts the resonance frequency of the first antenna to a high frequency side.

Moreover, in order to solve the aforementioned problem, a reception suppressing method according to the present invention is characterized by including a suppressing step of suppressing a transmission signal transmitted via a second antenna or a reception signal received via the second antenna from being received via a first antenna, while performing at least one of first signal processing performing predetermined signal processing on a transmission signal transmitted via the first antenna or a reception signal received via the first antenna, and second signal processing performing predetermined signal processing on the transmission signal transmitted via the second antenna or the reception signal received via the second antenna.

Effects of the Invention

According to the present invention, even if a plurality of antennas is provided, and a frequency bandwidth of a transmission signal or a reception signal of each antenna is in a close range with each other, interference between the signals is reduced, and thus communication can be preferably performed.

BRIEF DESCRIPTION OF THE DRAWINGS

FIG. 11 is a flow chart for illustrating a method of adjusting a resonance frequency by the reception suppressing unit.

Figure 1:
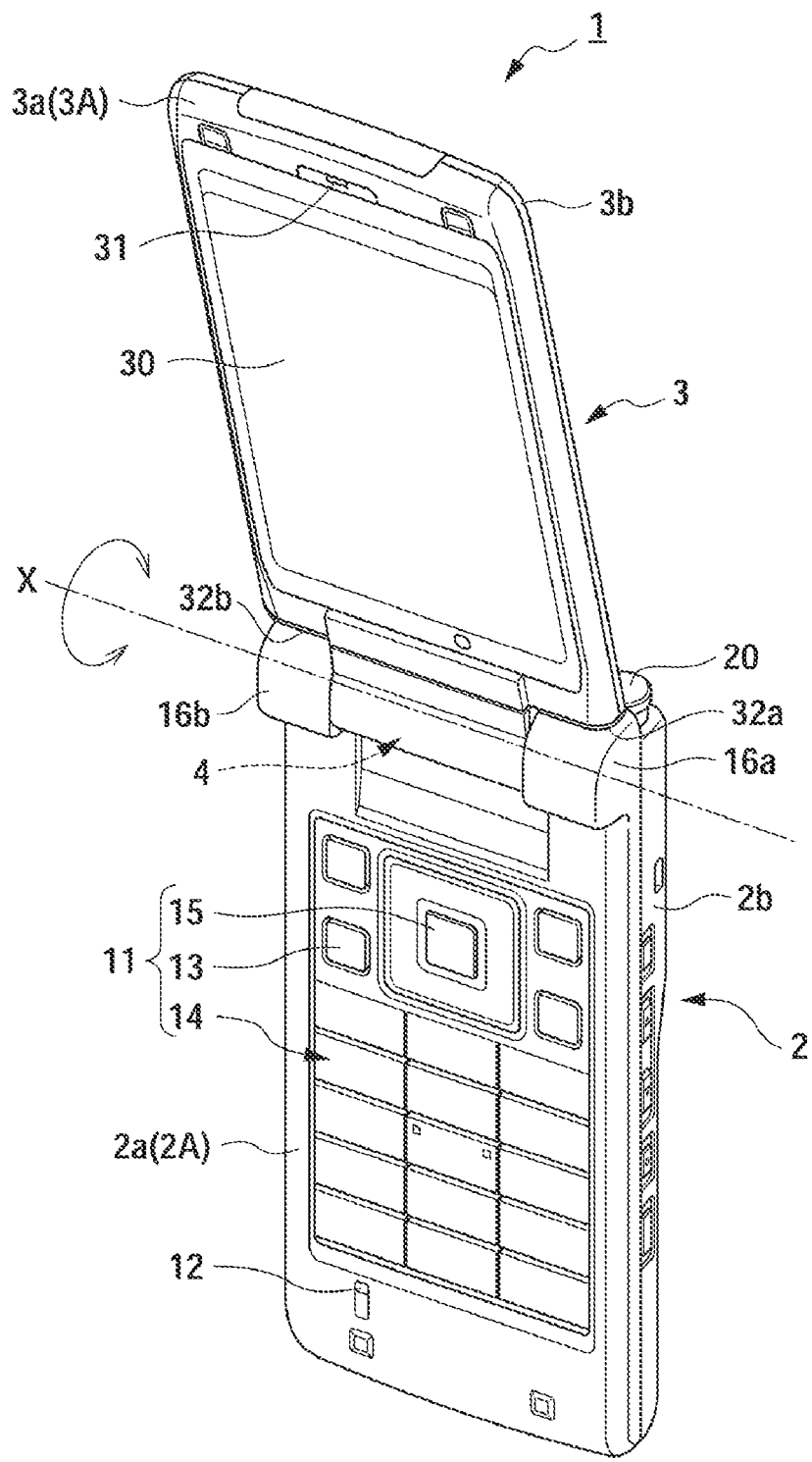
FIG. 1 is a perspective view of a state (first opened state) in which a cellular telephone device according to an embodiment of the present invention is opened.

EXPLANATION OF REFERENCE SYMBOLS 1 cellular telephone device
11 operation key set
20 first antenna unit
100 broadcast wave receiving unit (first signal processing means)
101 broadcast wave processing unit
103 circuit switching unit
103a first matching circuit
103b second matching circuit
103c first change-over switch
103d second change-over switch
150 communication unit (second signal processing means)
151 second antenna unit
152 communication processing unit
200 processing unit
205 reception suppressing unit

PREFERRED MODE FOR CARRYING OUT THE INVENTION

Embodiments of the present invention are hereinafter described with reference to the drawings. It should be noted that, although a mobile communication device according to the present invention is applied to a cellular telephone device in the embodiments described below, the present invention is not limited to a cellular telephone device, and can be applied to mobile electronic devices other than a cellular telephone, such as a portable game machine, a portable navigation device, a PDA (Personal Digital Assistant), a laptop PC, and an EL display or a liquid crystal display equipped with an operation unit.

Figure 2:
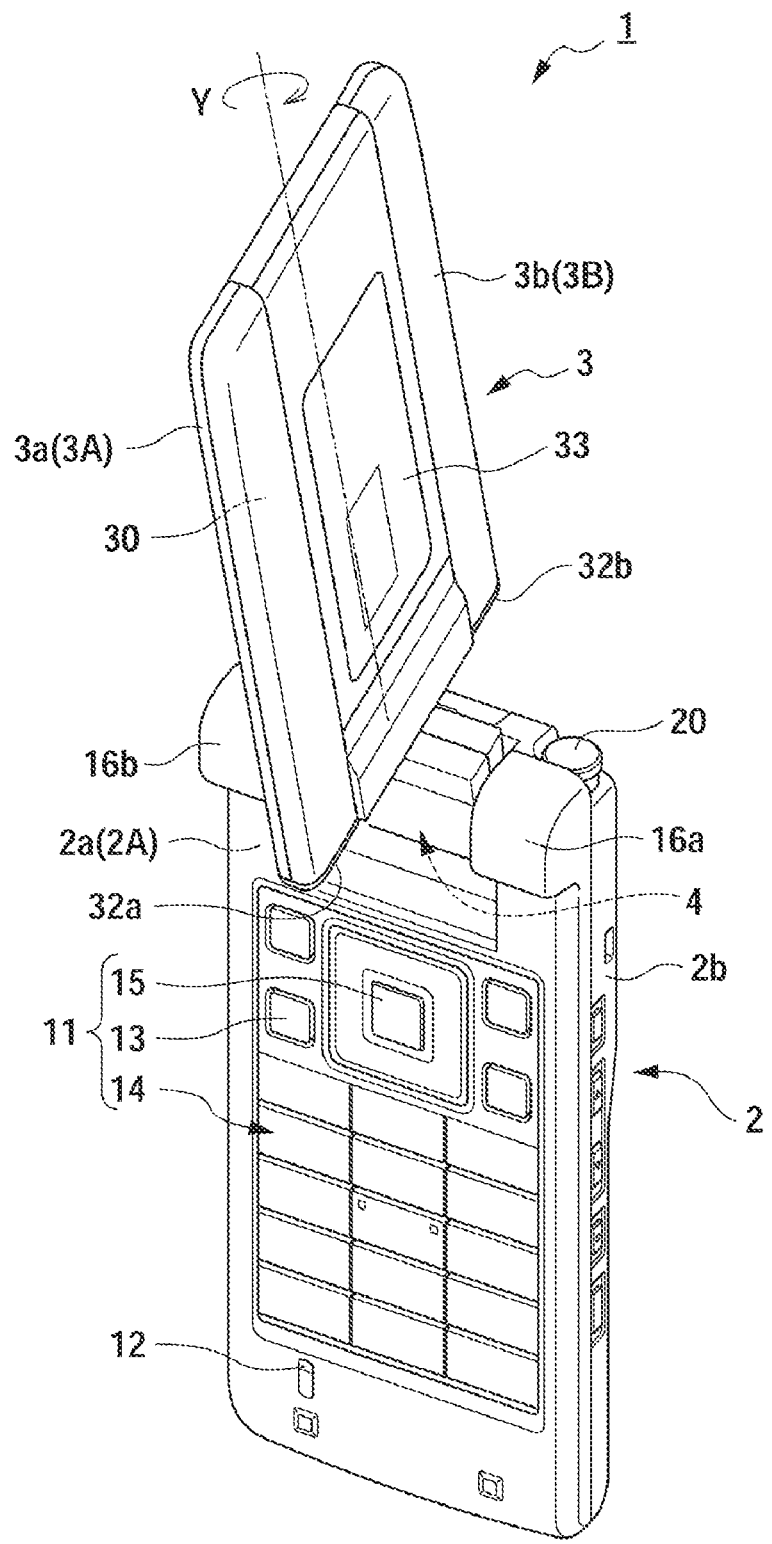
FIG. 2 is a perspective view of a state in which a display unit side body of the cellular telephone device according to the present embodiment is pivoted a predetermined angle about a pivot axis of a hinge portion.
Figure 3:
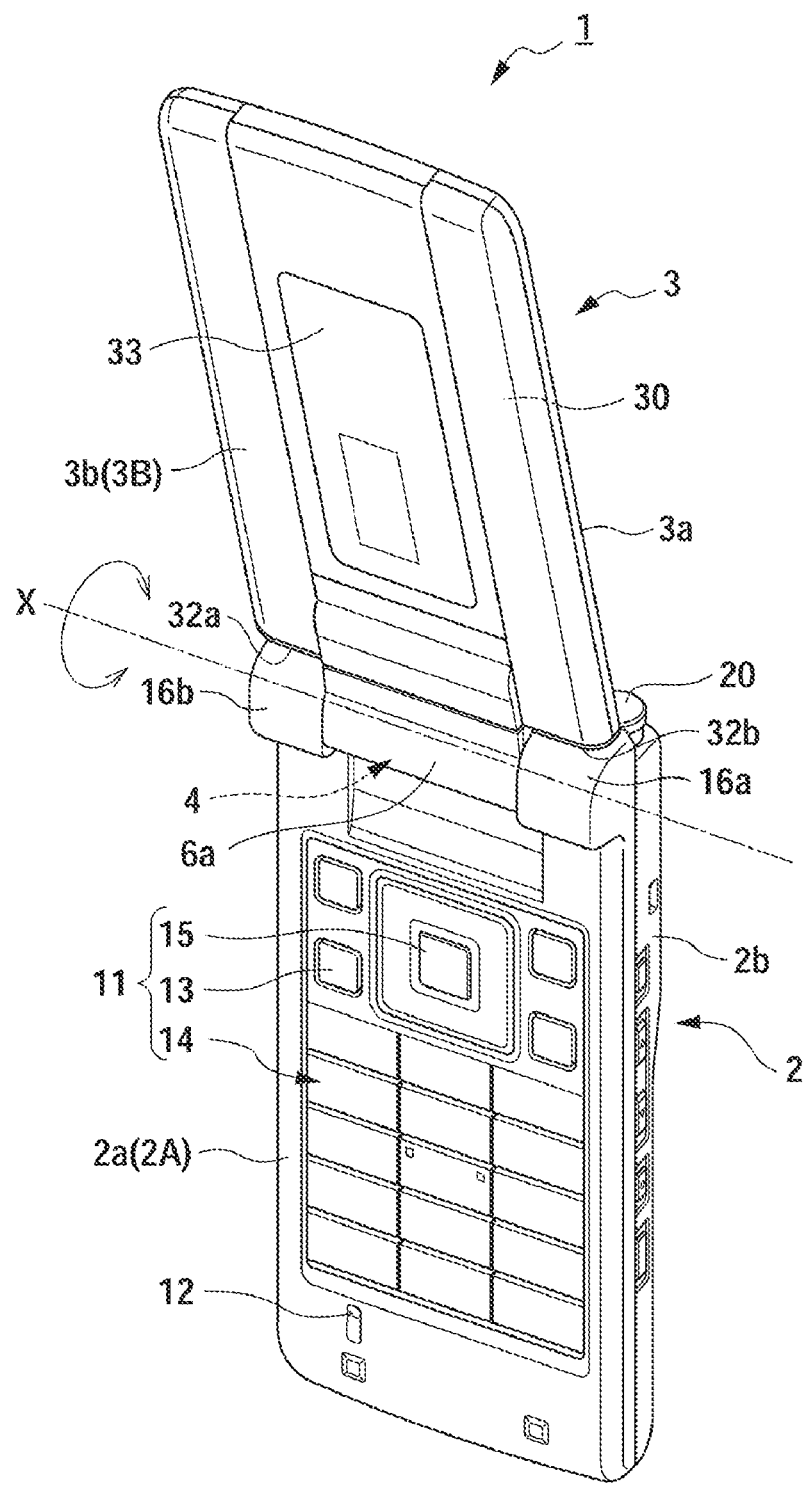
FIG. 3 is a perspective view of a state (turned state or second opened state) in which the display unit side body of the cellular telephone device according to the present embodiment is pivoted 180 degrees about the pivot axis of the hinge portion.
Figure 4:
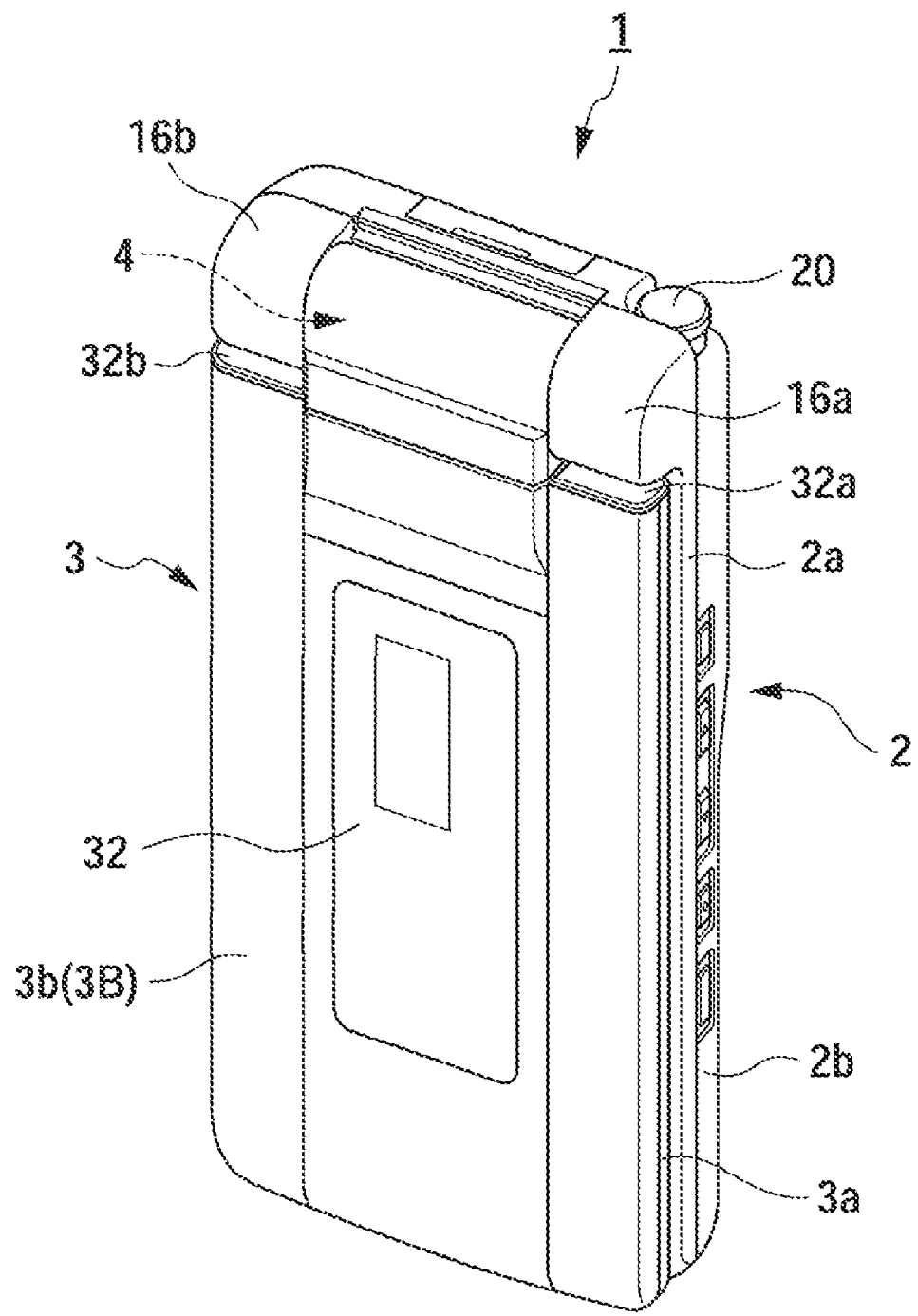
FIG. 4 is a plan view of a closed state (first closed state) by rotationally closing an operation unit side body and the display unit side body around an opening-and-closing axis of the hinge portion of the cellular telephone device according to the present embodiment.

Firstly, a basic structure of a cellular telephone device 1 according to an embodiment of the present invention is described with reference to FIGS. 1 to 4. FIG. 1 is a perspective view of a state (first opened state) in which the cellular telephone device 1 according to the present embodiment is opened. FIG. 2 is a perspective view of a state in which a display unit side body 3 (first body) of the cellular telephone device 1 according to the present embodiment is pivoted a predetermined angle about a pivot axis Y (first pivot axis) of a hinge portion 4 (base portion). FIG. 3 is a perspective view of a state (turned state or a second opened state) in which the display unit side body 3 of the cellular telephone device 1 according to the present embodiment is pivoted 180 degrees about the pivot axis Y of the hinge portion 4. FIG. 4 is a plan view of a state (first closed state) in which an operation unit side body 2 (second body) and the display unit side body 3 of the cellular telephone device 1 according to the present embodiment are closed by rotationally closing around an opening-and-closing axis X (second rotational axis) of the hinge portion 4.

As shown in FIGS. 1 to 4, the cellular telephone device 1 includes the display unit side body 3, which is the first body, and the operation unit side body 2, which is the second body. The operation unit side body 2 and the display unit side body 3 are connected via the hinge portion 4 including a 2-axis hinge mechanism, and the cellular telephone device 1 can be transformed into an opened state and a closed state, and the display unit side body 3 can be switched between a front side state and a back side state in each of the opened state and the closed state.

In other words, the hinge portion 4 connects the operation unit side body 2 and the display unit side body 3 to be openable to any angle around the opening-and-closing axis X, and includes the 2-axis hinge mechanism that connects the bodies to be rotatable to any angle around a pivot axis Y. The pivot axis Y is orthogonal to the opening-and-closing axis X.

Here, the closed state is a state in which the operation unit side body 2 and the display unit side body 3 are disposed so as to be mutually superimposed, and the opened state is a state in which the operation unit side body 2 and the display unit side body 3 are disposed so as not to be mutually superimposed. In addition, the front side state in the opened state (also referred to as the first opened state) is a state in which a display 30 disposed on a surface 3A of the display unit side body 3 and an operation key set 11 disposed on a surface 2A of the operation unit side body 2 are disposed so as to face the same side. The back side state in the opened state (also referred to as a second opened state) is a state in which the display 30 in the display unit side body 3 and the operation key set 11 in the operation unit side body 2 are disposed so as to face opposite sides from each other (see FIG. 3).

The front side state in the closed state (also referred to as the first closed state) is a state in which the display 30 in the display unit side body 3 is disposed so as to face the operation key set 11 in the operation unit side body 2 (see FIG. 4). The back side state in the closed state (also referred to as a second closed state) is a state in which the display 30 in the display unit side body 3 is disposed so as to be exposed and not face the operation key set 11 in the operation unit side body 2 (not shown).

The operation unit side body 2 has an outer surface mainly composed of an operation unit front case 2a and an operation unit rear case 2b. The operation unit side body 2 is configured to expose, on the operation unit front case 2a side, both the operation key set 11 and a microphone 12 into which the sound made by the user of the cellular telephone device 1 is input when conversing. Here, the operation key set 11 is configured with: function setting operation keys 13 for operating various functions such as for various settings, a telephone number directory function and a mail function; input operation keys 14 such as ten keys for inputting digits of a telephone number and characters for mail, and a selection operation key 15 for performing selection of various operations and scrolling up, down, left and right. In addition, the microphone 12 is disposed near a leading end (end opposite to the hinge portion 4) of the surface 2A side of the operation unit side body 2.

Predetermined functions are assigned (key assignment) to each key configuring the operation key set 11 in accordance with a transformation state such as the opened/closed state and the front/back side state of the operation unit side body 2 and the display unit side body 3, and the type of application that is running. An operation corresponding to a feature assigned to each key is executed by a user pressing one of the keys composing the operation key set 11 of the cellular telephone device 1.

For example, an interface for transmitting and receiving data with an external device (such as a host device), headphone and microphone terminals, a detachable external memory interface, and a terminal for recharging a battery are provided on a side of the operation unit side body 2.

Moreover, as shown in FIGS. 1 to 4, a first antenna 20 for receiving a broadcast wave, in which a reception angle of broadcast waves can be adjusted, is disposed to the operation unit side body 2.

The display unit side body 3 has an external surface thereof composed mainly of a display unit front case 3a and a display unit rear case 3b. The display 30 of a predetermined shape for displaying a variety of information, and a sound output unit 31 that outputs sound of the other party of the conversation are disposed so as to be exposed on the display unit front case 3a. The sound output unit 31 is disposed near a leading end (end opposite to the hinge portion 4) of the surface 3A side of the display unit side body 3.

In addition, a first buffering member 32a and a second buffering member 32b are provided on an end face of the display unit side body 3, to the side connected to the hinge portion 4.

Furthermore, a sub-display 33 for displaying a variety of information is disposed so as to be exposed on the display unit rear case 3b of the display unit side body 3. Each of the display 30 and the sub-display 33 is configured with a liquid crystal display panel, a drive circuit that drives the liquid crystal display panel, a light source unit such as a backlight that irradiates light from the back surface side of the liquid crystal display panel, etc. Moreover, the operation unit side body 2 has a first gripper 16a and a second gripper 16b for gripping the hinge portion 4 in the pivot axis Y that is orthogonal to the opening-and-closing axis X.

It should be noted that, although the cellular telephone device 1 is described as being foldable by the hinge portion 4 in the present embodiment, it is not limited to such a flip type. For example, the cellular telephone device 1 may be of: a slider type in which one body slides to one direction from a state in which the operation unit side body 2 and the display unit side body 3 are mutually superimposed; a rotating type (turning type) in which one body is rotated around an axis line along the direction of superimposing the operation unit side body 2 and the display unit side body 3; or a straight type in which the operation unit side body 2 and the display unit side body 3 are disposed in a single body without a connecting portion.

Figure 5:
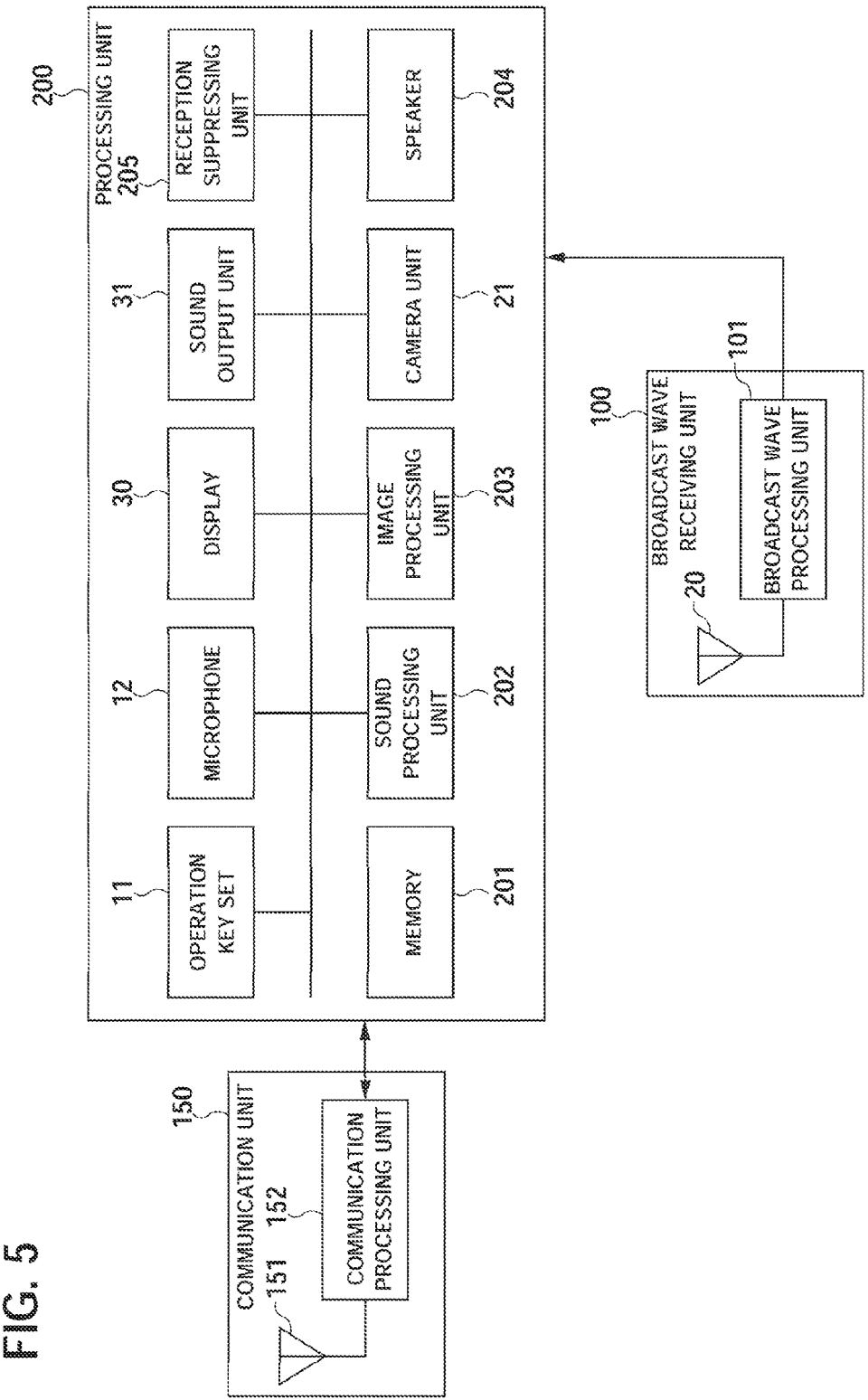
FIG. 5 is a block diagram showing features of the cellular telephone device according to the present invention.

Next, each function of the cellular telephone device 1 is described with reference to the functional block diagram of FIG. 5. As shown in FIG. 5, the cellular telephone device 1 includes: a broadcast wave receiving unit 100 (first signal processing means) that receives a broadcast wave; a communication unit 150 (second signal processing means) that communicates with an external device (for example, a base station); and a processing unit 200 that performs predetermined processing.

Here, a configuration and behavior of the broadcast wave receiving unit 100 are described. The broadcast wave receiving unit 100 includes: a first antenna unit 20 for receiving a broadcast wave; and a broadcast wave processing unit 101 that performs predetermined processing on a signal received via the first antenna unit 20. Moreover, the first antenna unit 20 is configured such that a reception angle of radio waves can be adjusted as described above.

In addition, the broadcast wave receiving unit 100 receives so-called one-segment broadcasting. Here, the one-segment broadcasting is described. The terrestrial digital broadcasting uses radio waves of a UHF band of 470 to 770 MHz, in which a single channel (bandwidth of 6 MHz) is frequency-divided into 14 segments, and 13 segments (bandwidth of 5.6 MHz) among them are used for broadcasting. Furthermore, the remaining one segment is used as a guard band for avoiding radio interference with adjacent channels.

Moreover, among the 13 segments, a central segment is assigned for the one-segment broadcasting. Although the band for the one-segment broadcasting is as narrow as 429 kHz, a noise-resistant modulation method (QPSK-OFDM: Quadrature Phase Shift Keying-Orthogonal Frequency Division Multiplexing method) is employed because it is directed to mobile terminals; and since it requires reception of only one segment, the power consumption can be suppressed as compared to reception of analog broadcasting.

In addition, ISDB-T (Integrated Services Digital Broadcasting-Terrestrial), which is the Japanese terrestrial digital broadcasting method, is characterized in its capability of changing the modulation method of carrier waves and the strength of error correction at each level. This makes it possible to modulate the one segment with a noise-resistant method for mobile terminals, and modulate the remaining 12 segments for fixed receivers by giving priority to information rates for broadcasting with high-definition.

Next, a configuration and behavior of the communication unit 150 are described. The communication unit 150 includes: a second antenna unit 151 that performs communication by phone and communication by mail with other communication terminals via a base station, based on a predetermined communication method (for example, CDMA (Code Division Multiple Access) 2000_1x or the like); and a communication processing unit 152 that is configured with a transmitting circuit that performs transmission processing and a receiving circuit that performs reception processing.

The second antenna unit 151 communicates with a base station via a predetermined usable frequency band (for example, 824 to 875 MHz). Moreover, a frequency band of a transmission signal transmitted from the second antenna unit 151 to the base station is, for example, 824 MHz, and a frequency band of a reception signal received at the second antenna unit 151 from the base station is, for example, 875 MHz.

In the communication processing unit 152, a signal received via the second antenna unit 151 is demodulated by the receiving circuit, and the signal thus processed is transmitted to the processing unit 200; on the other hand, a signal transmitted from the processing unit 200 is modulated by the transmitting circuit, and the signal thus processed is transmitted to the base station via the second antenna unit 151.

In addition, the processing unit 200 includes: the operation key set 11; the microphone 12; the display 30; the sound output unit 31; memory 201 that stores predetermined data; a sound processing unit 202 that performs predetermined sound processing; an image processing unit 203 that performs predetermined image processing; a camera unit 21 that captures an image of a subject; a speaker 204 that outputs ringtones and the like; and a reception suppressing unit 205 that adjusts a frequency of the first antenna unit 20.

Here, the cellular telephone device 1 is designed such that television broadcasting is received via the first antenna unit 20 that receives terrestrial digital broadcasting to be displayed on the display 30, while communication can be performed via the second antenna unit 151 at the same time.

Figure 6:
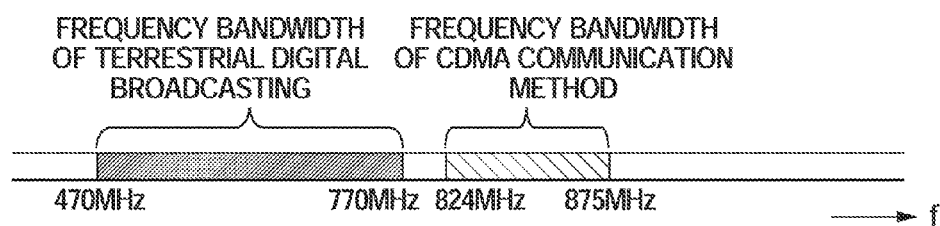
FIG. 6 is a diagram for illustrating allocation of a frequency band of terrestrial digital broadcasting and a frequency band of CDMA2000_1x.

Furthermore, FIG. 6 shows an allocation table of a frequency band of the terrestrial digital broadcasting and a frequency band of CDMA2000_1x. As shown in FIG. 6, since a low frequency band (824 MHz) in the CDMA communication method is located near a channel assigned to a high frequency band (770 MHz) of the terrestrial digital broadcasting, if a channel assigned to 770 MHz of the terrestrial digital broadcasting is received and displayed on the display 30, while communication is performed by utilizing the low frequency band (824 MHz) of the CDMA communication method at the same time, there is a possibility that the terrestrial digital broadcasting may be interfered.

Figure 7A:
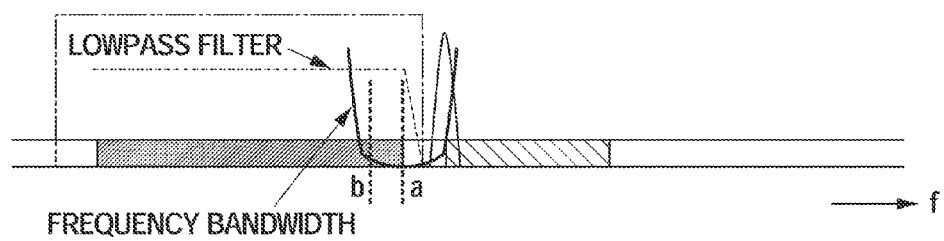
FIG. 7A is a schematic diagram of a case in which an interfering wave is eliminated by way of a lowpass filter.

This happens because, in a case in which a resonance frequency fc is 770 MHz, the low frequency band (824 MHz) of the CDMA communication method falls within a predetermined band in which the resonance frequency fc (point a in FIG. 7A and FIG. 7B) is the center thereof. Therefore, when the first antenna unit 20 receives a channel assigned to 770 MHz, the low frequency band (824 MHz) of the CDMA communication method is also received, a result of which the terrestrial digital broadcasting is interfered.

Moreover, although the influence of such an interfering wave can be avoided by utilizing a lowpass filter, such a configuration increases the size of circuits, thereby making it impossible to avoid an increase in cost.

Thus, according to the present invention, the influence of the aforementioned interfering wave is avoided by adjusting the resonance frequency fc of the first antenna unit 20 by the reception suppressing unit 205 under a controlled condition.

Here, behavior of the reception suppressing unit 205 is described. While predetermined signal processing by the broadcast wave receiving unit 100 and predetermined signal processing by the communication unit 150 are being performed, the reception suppressing unit 205 performs adjustment such that the resonance frequency fc of the first antenna unit 20 is shifted away from a frequency of a transmission signal transmitted via the second antenna unit 151 or a frequency of a reception signal received via the second antenna unit 151.

More specifically, in a case in which a channel assigned to 770 MHz of the terrestrial digital broadcasting is received via the first antenna unit 20, and predetermined processing is performed by the broadcast wave processing unit 101, while communication is performed via the second antenna unit 151 by utilizing the low frequency band (824 MHz) of the CDMA communication method, and predetermined processing is performed by the communication processing unit 152, the reception suppressing unit 205 performs adjustment such that a band of the first antenna unit 20 is narrowed, or the resonance frequency fc of the first antenna unit 20 is shifted toward the low frequency side to an extent that a signal of the resonance frequency fc of the first antenna unit 20 can be transmitted or received.

With the reception suppressing unit 205 operating in this way, without using a lowpass filter, while achieving reduction of the interference of the signal of the low frequency band of the CDMA communication method due to the second antenna unit 151, the terrestrial digital broadcasting can be preferably received, and communication can be performed by the CDMA communication method at the same time.

In addition, in a case in which a frequency of a signal transmitted or received via the first antenna unit 20 is a frequency that is closer to a frequency of a transmission signal transmitted via the second antenna unit 151 or a frequency of a reception signal received via the second antenna unit 151 as compared to a predetermined frequency defined in advance, in other words, in a case in which interference of a signal related to the low frequency band of the CDMA communication method due to the second antenna unit 151 cannot be ignored, it is preferable that the reception suppressing unit 205 performs adjustment such that the resonance frequency fc of the first antenna unit 20 is shifted away from the frequency of the transmission signal transmitted via the second antenna unit 151 or the frequency of the reception signal received via the second antenna unit 151 to an extent that the signal having the resonance frequency fc related to the first antenna unit 20 can be transmitted or received.

With the reception suppressing unit 205 operating in this way, without using a lowpass filter, a predetermined channel (for example, a channel assigned to a high frequency band) of the terrestrial digital broadcasting can be preferably received, while communication can be performed by the CDMA communication method. Furthermore, in a case in which a frequency of a transmission signal or a reception signal of the first antenna unit 20 is farther from a frequency of a transmission signal transmitted via the second antenna unit 151 or a frequency of a reception signal received via the second antenna unit 151 as compared to a predetermined frequency defined in advance, in other words, in a case in which the interference of a signal related to the low frequency band of the CDMA communication method due to the second antenna unit 151 can be ignored, the resonance frequency fc of the first antenna unit 20 is not adjusted by the reception suppressing unit 205, and thus reduction in transmission sensitivity or reception sensitivity of the first antenna unit 20 due to such adjustment can also be suppressed (although the extent of such reduction is small).

Moreover, while signal processing by the broadcast wave receiving unit 100 and signal processing by the communication unit 150 are being performed, the reception suppressing unit 205 performs adjustment such that the resonance frequency fc of the first antenna unit 20 is shifted away from a frequency of a transmission signal transmitted via the second antenna unit 151 or a frequency of a reception signal received via the second antenna unit 151. In a case in which the signal processing by the communication unit 150 is subsequently terminated, it is preferable that the reception suppressing unit 205 returns the frequency of the broadcast signal received via the first antenna unit 20 to the state before the adjustment, in other words, to the original position of the resonance frequency fc.

With the reception suppressing unit 205 operating in this way, in a case in which predetermined signal processing by the broadcast wave receiving unit 100 and predetermined signal processing by the communication unit 150 are performed, predetermined adjustment is performed by the reception suppressing unit 205, and predetermined signal processing by the communication unit 150 is subsequently terminated, the state resulting from the predetermined adjustment performed by the reception suppressing unit 205 is returned to the original state, and thus the extent of reduction in the transmission sensitivity or reception sensitivity of the first antenna unit 20 due to the adjustment can be minimized, and the terrestrial digital broadcasting can be preferably received.

Figure 8:
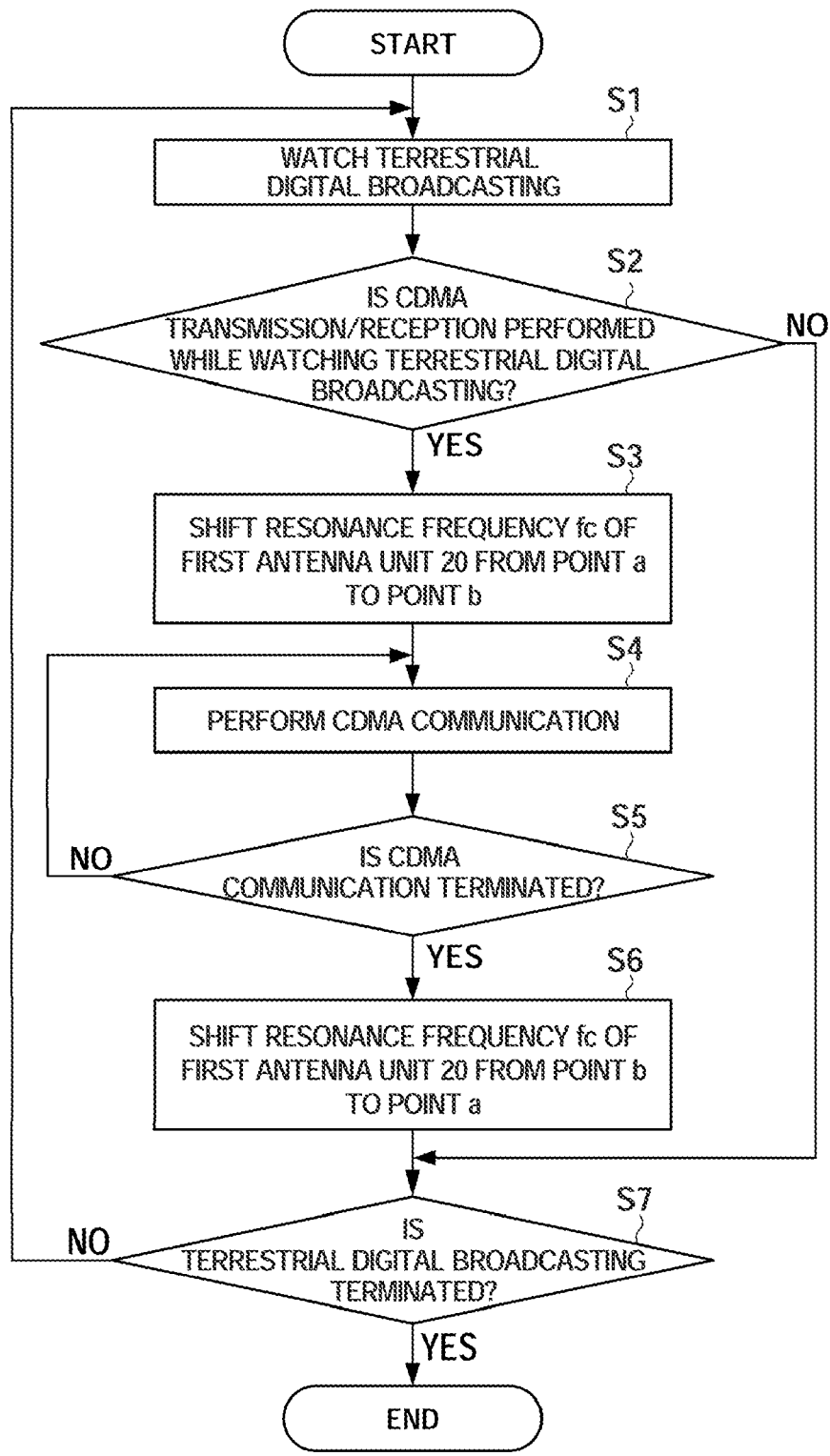
FIG. 8 is a flow chart for illustrating a method of adjusting a resonance frequency by a reception suppressing unit.

Here, a method of adjusting the resonance frequency fc by the reception suppressing unit 205 is described with reference to a flow chart shown in FIG. 8. It should be noted that the reception suppressing unit 205 is hereinafter described as being configured to perform adjustment such that the resonance frequency fc of the first antenna unit 20 is shifted toward the low frequency side in a case in which reception of the terrestrial digital broadcasting and communication by the CDMA communication method are performed.

In Step S1, the cellular telephone device 1 receives terrestrial digital broadcasting via the first antenna unit 20, and performs predetermined processing by the broadcast wave processing unit 101.

In Step S2, the reception suppressing unit 205 determines whether communication by the CDMA communication method is performed while receiving a channel assigned to 770 MHz of the terrestrial digital broadcasting. In a case in which it has been determined that communication by the CDMA communication method is being performed while receiving the terrestrial digital broadcasting, the processing proceeds to Step S3, or in a case in which it has been determined that communication by the CDMA communication method is not being performed while receiving the terrestrial digital broadcasting, the processing proceeds to Step S7.

Figure 7B:
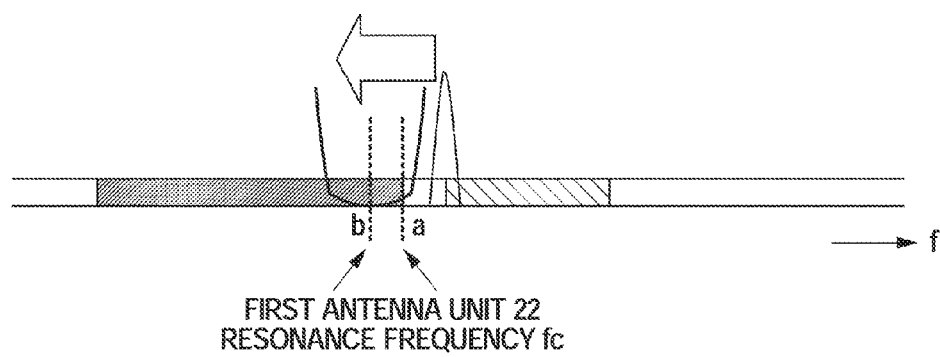
FIG. 7B is a schematic diagram of a case in which an interfering wave is eliminated by way of the present invention.

In Step S3, the reception suppressing unit 205 performs adjustment such that the resonance frequency fc of the first antenna unit 20 is shifted toward the low frequency side. More specifically, as shown in FIG. 7B, in a case in which the resonance frequency fc is 770 MHz, the resonance frequency fc (point a in FIG. 7B) is shifted to a predetermined position (point b in FIG. 7B) on the low frequency side. It should be noted that the reception suppressing unit 205 shall shift the resonance frequency fc to a predetermined position on the low frequency side within a range in which a channel assigned to 770 MHz can be received.

In Step S4, the reception suppressing unit 205 controls the communication processing unit 152 to perform communication by the CDMA communication method and perform predetermined processing. The communication processing unit 152 generates a transmission signal by utilizing a frequency band of 824 MHz, and outputs a transmission signal via the second antenna unit 151 to the outside.

In Step S5, the reception suppressing unit 205 determines whether communication by the CDMA communication method is terminated. In a case in which it has been determined that communication by the CDMA communication method is terminated, the processing proceeds to Step S6, or in a case in which it has been determined that communication by the CDMA communication method is not terminated, the processing returns to Step S4.

In Step S6, the reception suppressing unit 205 returns the resonance frequency fc of the first antenna unit 20, which has been shifted to the low frequency side by the processing in Step S3, to the original position. More specifically, in a case in which the resonance frequency fc is 770 MHz, the position shifted toward the low frequency side (point b in FIG. 7B)) is returned to the original position of the resonance frequency fc (point a in FIG. 7B).

In Step S7, the reception suppressing unit 205 determines whether the reception of the terrestrial digital broadcasting is continued via the first antenna unit 20. In a case in which it has been determined that the reception of the terrestrial digital broadcasting is continued, the processing returns to Step S1, or in a case in which it has determined that the reception of the terrestrial digital broadcasting is terminated, the processing is terminated.

Here, communication between the cellular telephone device 1 and the base station by the CDMA communication method is described. In the CDMA communication method, the base station transmits data of a uniform output level to all the cellular telephone devices 1 in an area in which transmission and reception are possible. On the other hand, each of the cellular telephone devices 1 changes its transmission level depending on a distance, etc. from the base station. Therefore, in a case in which it is not required to transmit a transmission signal with high power, the cellular telephone device 1 transmits a transmission signal with low power.

In addition, even if predetermined signal processing by the broadcast wave receiving unit 100 and predetermined signal processing by the communication unit 150 are being performed, in a case in which the output level of a transmission signal transmitted via the second antenna unit 151 or a reception signal received via the second antenna unit 151 is low, the reception of the terrestrial digital broadcasting may not be affected. In such a case, adjustment by the reception suppressing unit 205 is not required.

Accordingly, in a case in which intensity of a transmission signal transmitted via the second antenna unit 151 or intensity of a reception signal received via the second antenna unit 151 is higher than a predetermined intensity defined in advance, it is preferable that the reception suppressing unit 205 performs adjustment such that the resonance frequency fc of the first antenna unit 20 is shifted away from a frequency of a transmission signal transmitted via the second antenna unit 151 or a frequency of a reception signal received via the second antenna unit 151.

With the reception suppressing unit 205 operating in this way, even if predetermined signal processing by the broadcast wave receiving unit 100 and predetermined signal processing by the communication unit 150 are being performed, by adjusting the resonance frequency fc of the broadcast signal received via the first antenna unit 20 as may be necessary, the terrestrial digital broadcasting can be preferably received, and communication can be performed by the CDMA communication method at the same time.

Other Embodiment 1

Moreover, the aforementioned cellular telephone device 1 has a function in which, in a case in which CDMA communication is performed by using the second antenna unit 151 (in a case in which transmission and reception of a mail message and the like are performed) while communication is being performed via the first antenna unit 20 as a tunable antenna (for example, while a television program is being watched), by appropriately switching adjustment circuits that are connected to the first antenna unit 20, reduction of signal interference of a low frequency band of the CDMA communication method due to the second antenna unit 151 is achieved, a result of which communication via the first antenna unit 20 can be preferably performed, while communication via the second antenna unit 151 can also be performed.

Figure 9:
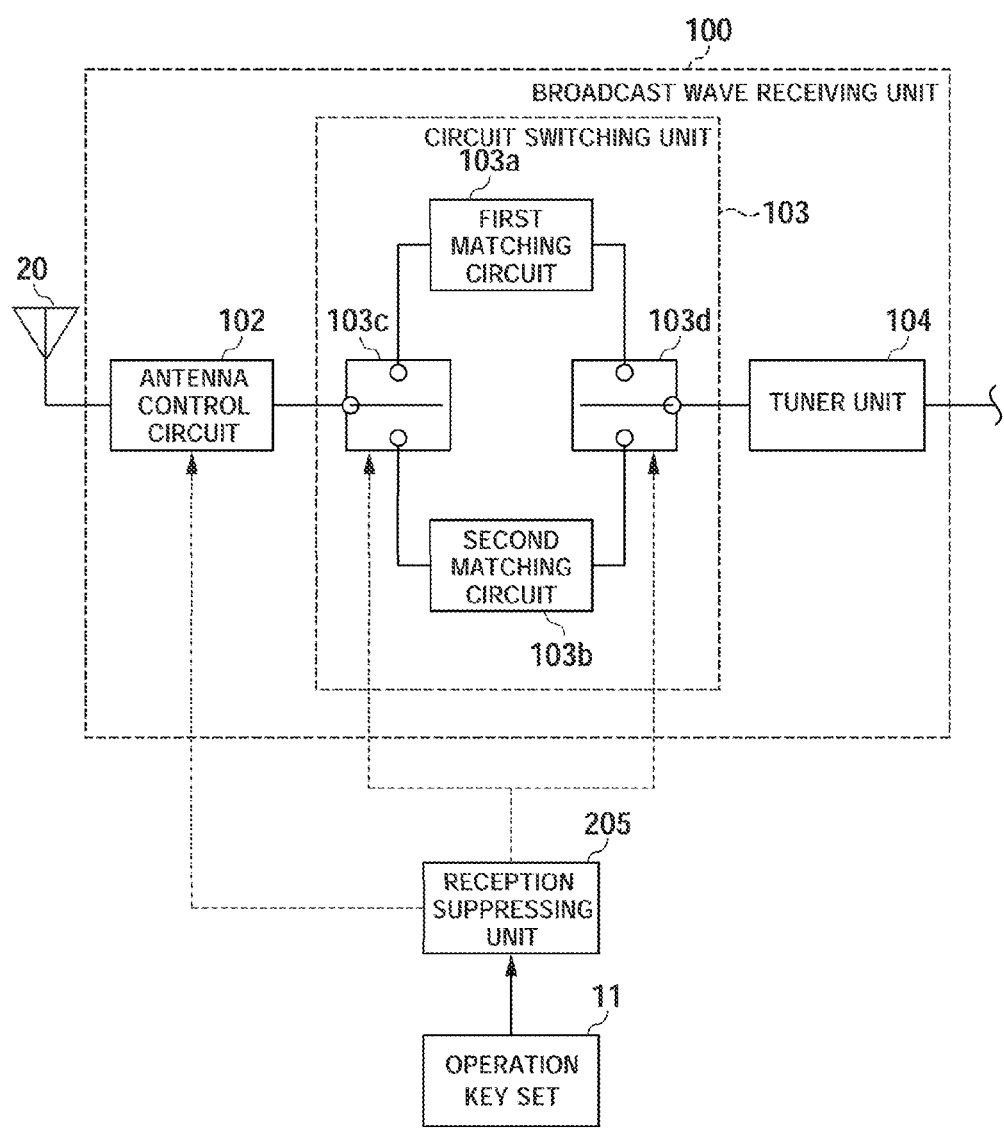
FIG. 9 is a block diagram showing features of the cellular telephone device according to the present invention.

Here, this function is implemented by the broadcast wave receiving unit 100 and the reception suppressing unit 205 operating together in a coordinated manner. A detailed configuration and behavior are hereinafter described. As shown in FIG. 9, the cellular telephone device 1 includes the first antenna unit 20, an antenna control circuit 102, a circuit switching unit 103, a tuner unit 104, and the reception suppressing unit 205.

As shown in FIG. 9, the circuit switching unit 103 includes a first matching circuit 103a, a second matching circuit 103b, a first change-over switch 103c, and a second change-over switch 103d.

Figure 10A:
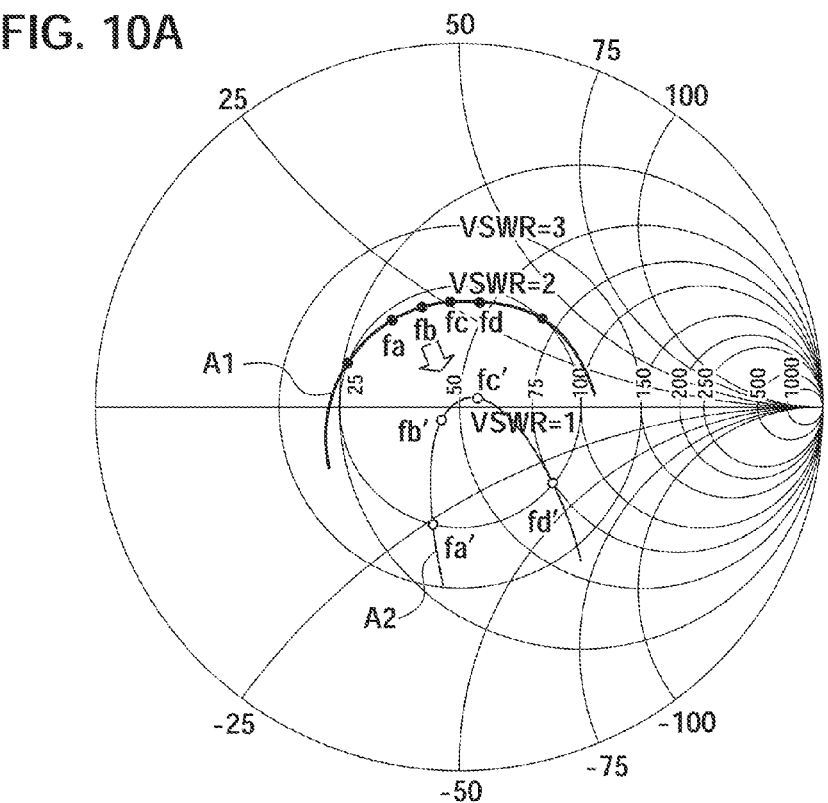
FIG. 10 is a diagram for illustrating change of a resonance curve in a case in which a matching circuit is switched.
Figure 10B:
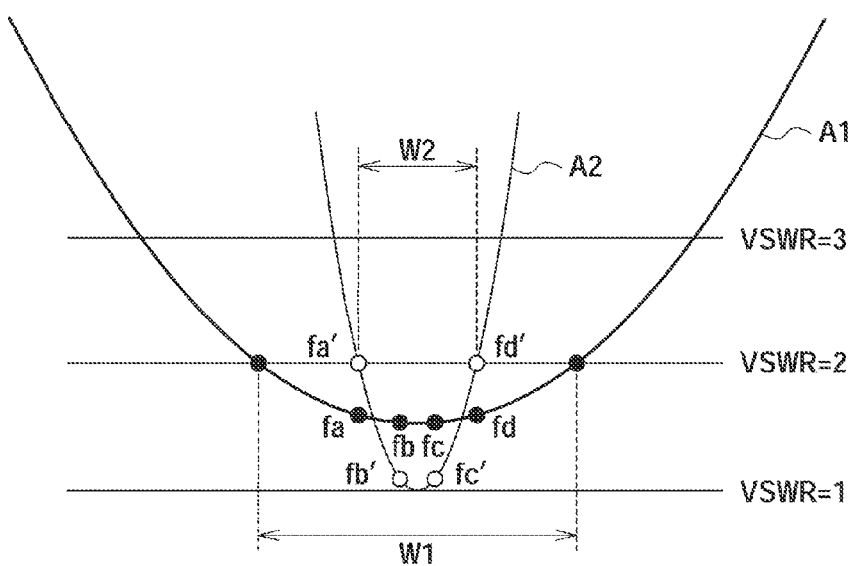

As shown in FIG. 10A and FIG. 10B, a resonance curve A1 related to the first matching circuit 103a is set such that a bandwidth of a resonance frequency of the first antenna unit 20 is a constant width (the bandwidth is set at W1 when the reference is VSWR=2), and a Q-value is set at a constant value. The Q-value indicates a sharpening degree of a resonance frequency of the first matching circuit 103a.

As shown in FIG. 10A and FIG. 10B, a resonance curve A2 related to the second matching circuit 103b is set such that a bandwidth of a resonance frequency of the first antenna unit 20 is narrower than the constant width (the bandwidth is set at W2 when the reference is VSWR=2), and the Q-value of the resonance frequency is set higher than the constant value. The Q-value indicates a sharpening degree of a resonance frequency of the second matching circuit 103b, and a higher Q-value is preferable in order to narrow the bandwidth W2.

The first change-over switch 103c performs switching for connecting the antenna control circuit 102 to the first matching circuit 103a or the second matching circuit 103b. The second change-over switch 103d performs switching for connecting the first matching circuit 103a or the second matching circuit 103b to the tuner unit 104.

In this way, the circuit switching unit 103, to which the tunable antenna (first antenna unit 20) is connected via the antenna control circuit 102 of the cellular telephone device 1, is configured with the first matching circuit 103a and the second matching circuit 103b, of which Q-values are different.

More specifically, as shown in FIGS. 10 (a) and (b), in the first matching circuit 103a, the bandwidth of the resonance frequency at VSWR=2 is set at W1, and for example, VSWR of a frequency fa to a frequency fd of a signal that is intended to be received is almost 1.5. In addition, in the second matching circuit 103b, the bandwidth of the resonance frequency at VSWR=2 is set at W2, and for example, as for VSWR of a frequency fa' to a frequency fd' of a signal that is intended to be received, VSWR of a frequency fb' and a frequency fc' is almost 1, and VSWR of the frequency fa' and the frequency fd' is almost 2. Therefore, in a case of assuming that the frequency fa=the frequency fa', the frequency fb=the frequency fb', the frequency fc=the frequency fc', and the frequency fd=the frequency fd', an average value (1.5) of VSWR at the frequency fa to the frequency fd related to the first matching circuit 103a and an average value (1.5) at VSWR of the frequency fa' to the frequency fd' related to the second matching circuit 103b are almost identical, and it may be considered that the reception sensitivity thereof is identical.

In the cellular telephone device 1, in a case in which communication is being performed via the first antenna unit 20, and CDMA communication is not being performed via the second antenna unit 151 (for example, in a case in which a television program is being watched but CDMA communication is not being performed), the communication is being performed via the first antenna unit 20 by switching to the first matching circuit 103a; or in a case in which CDMA communication is performed by using the second antenna unit 151, control is performed so as to switch to the second matching circuit 103b in order to avoid influence of interfering waves.

Therefore, in the cellular telephone device 1, the broadcast wave receiving unit 100 includes two matching circuits of which Q-values are different, and in a case in which communication in two communication systems (the broadcast wave receiving unit 100 and the communication unit 150) conflicts with each other, by switching to another matching circuit (second matching circuit 103b), CDMA communication can be performed while watching a television program, and it is not necessary to separately provide a filter for suppressing interfering waves. It should be noted that, although the broadcast wave receiving unit 100 has been described as including two matching circuits in the present embodiment, it is not limited thereto, and it may be configured with three or more matching circuits depending on design conditions. Moreover, VSWR is not limited to that in the present embodiment either, and VSWR may be set at other values.

Here, behavior of the reception suppressing unit 205 is described. While predetermined signal processing by the broadcast wave receiving unit 100 and predetermined signal processing by the communication unit 150 are being performed, the reception suppressing unit 205 performs adjustment such that the bandwidth of the resonance frequency of the first antenna unit 20 is narrowed to a constant width, and the Q-value is increased to a constant value, so as not to be superimposed on a frequency of a transmission signal transmitted via the second antenna unit 151 or a frequency of a reception signal received via the second antenna unit 151.

More specifically, in a case in which communication by the CDMA communication method is performed via the second antenna unit 151 while receiving a channel assigned to 770 MHz of the terrestrial digital broadcasting via the first antenna unit 20, the reception suppressing unit 205 controls switching of the first change-over switch 103c and the second change-over switch 103d, and switches from the first matching circuit 103a to the second matching circuit 103b.

With the reception suppressing unit 205 operating in this way, without using a lowpass filter, while achieving reduction of the interference of the signal of the low frequency band of the CDMA communication method due to the second antenna unit 151, the terrestrial digital broadcasting can be preferably received via the first antenna unit 20, and communication can be performed by the CDMA communication method via the second antenna unit 151 at the same time.

In addition, in a case in which the frequency of the transmission signal transmitted via the first antenna unit 20 or the frequency of the reception signal received via the first antenna unit 20 is a frequency that is closer to the frequency of the transmission signal transmitted via the second antenna unit 151 or the frequency of the reception signal received via the second antenna unit 151 as compared to a predetermined frequency defined in advance, the reception suppressing unit 205 controls such that the bandwidth of the resonance frequency of the first antenna unit 20 is narrowed to a constant width, and the Q-value is increased to a constant value, so as not to be superimposed on the frequency of the transmission signal transmitted via the second antenna unit 151 or the frequency of the reception signal received via the second antenna unit 151, a result of which the transmission signal transmitted via the second antenna unit 151 or the reception signal received via the second antenna unit 151 is suppressed from being received via the first antenna unit 20.

More specifically, in a case in which the frequency of the transmission signal transmitted via the first antenna unit 20 or the frequency of the reception signal received via the first antenna unit 20 is a frequency that is closer to the frequency of the transmission signal transmitted via the second antenna unit 151 or the frequency of the reception signal received via the second antenna unit 151 as compared to a predetermined frequency defined in advance, the reception suppressing unit 205 controls to switch the first change-over switch 103c and the second change-over switch 103d, and switches from the first matching circuit 103a to the second matching circuit 103b. Furthermore, in a case in which the frequency of the transmission signal transmitted via the first antenna unit 20 or the frequency of the reception signal received via the first antenna unit 20 is a frequency that is farther from the frequency of the transmission signal transmitted via the second antenna unit 151 or the frequency of the reception signal received via the second antenna unit 151 as compared to a predetermined frequency defined in advance, the reception suppressing unit 205 controls to switch the first change-over switch 103c and the second change-over switch 103d, and switches to the first matching circuit 103a.

With the reception suppressing unit 205 operating in this way, without using a lowpass filter, a predetermined channel (for example, a channel assigned to a high frequency band) of the terrestrial digital broadcasting can be preferably received, and communication by the CDMA communication method can be performed. Moreover, in a case in which the frequency of the transmission signal or the reception signal of the first antenna unit 20 is farther from the frequency of the transmission signal transmitted via the second antenna unit 151 or the frequency of the reception signal received via the second antenna unit 151 as compared to a predetermined frequency defined in advance, in other words, in a case in which the interference of the signal related to the low frequency band of the CDMA communication method via the second antenna unit 151 can be ignored, the resonance frequency of the first antenna unit 20 is not adjusted by the reception suppressing unit 205, and thus reduction in transmission sensitivity or reception sensitivity of the first antenna unit 20 due to such adjustment can also be suppressed (although the extent of such reduction is small).

In addition, in a case in which intensity of the transmission signal transmitted via the second antenna unit 151 or intensity of the reception signal received via the second antenna unit 151 is higher than a predetermined intensity defined in advance, the reception suppressing unit 205 performs adjustment such that the bandwidth of the resonance frequency of the first antenna unit 20 is narrowed to a constant width, and the Q-value is increased to a constant value, so as not to be superimposed on the frequency of the transmission signal transmitted via the second antenna unit 151 or the frequency of the reception signal received via the second antenna unit 151, a result of which the transmission signal transmitted via the second antenna unit 151 or the reception signal received via the second antenna unit 151 is suppressed from being received via the first antenna unit 20.

More specifically, in a case in which intensity of the transmission signal transmitted via the second antenna unit 151 or intensity of the reception signal received via the second antenna unit 151 is higher than a predetermined intensity defined in advance, the reception suppressing unit 205 controls to switch the first change-over switch 103c and the second change-over switch 103d. Furthermore, in a case in which the intensity of the transmission signal transmitted via the second antenna unit 151 or intensity of the reception signal received via the second antenna unit 151 is lower than the predetermined intensity defined in advance, the reception suppressing unit 205 controls to switch the first change-over switch 103c and the second change-over switch 103d, and switches to the first matching circuit 103a.

With the reception suppressing unit 205 operating in this way, without using a lowpass filter, a predetermined channel (for example, a channel assigned to a high frequency band) of the terrestrial digital broadcasting can be preferably received, and communication can be performed by the CDMA communication method. Moreover, in a case in which intensity of the frequency of the transmission signal transmitted via the second antenna unit 151 or intensity of the frequency of the reception signal received via the second antenna unit 151 is lower than intensity of the frequency of the transmission signal or the reception signal of the first antenna unit 20 as compared to a predetermined intensity defined in advance, in other words, in a case in which the interference of the signal related to the low frequency band of the CDMA communication method via the second antenna unit 151 can be ignored, the resonance frequency of the first antenna unit 20 is not adjusted by the reception suppressing unit 205, and thus reduction in transmission sensitivity or reception sensitivity of the first antenna unit 20 due to such adjustment can also be suppressed (although the extent of such reduction is small).

In addition, while predetermined signal processing by the broadcast wave receiving unit 100 and predetermined signal processing by the communication unit 150 are being performed, the reception suppressing unit 205 performs adjustment such that the bandwidth of the resonance frequency of the first antenna unit 20 is narrowed to a constant width, and the Q-value is increased to a constant value, so as not to be superimposed on a frequency of a transmission signal transmitted via the second antenna unit 151 or a frequency of a reception signal received via the second antenna unit 151, and in a case in which the signal processing by the communication unit 150 is subsequently terminated, the reception suppressing unit 205 returns the frequency band of the resonance frequency and the Q-value of the first antenna unit 20 to the state before the adjustment.

With the reception suppressing unit 205 operating in this way, in a case in which predetermined signal processing by the broadcast wave receiving unit 100 and predetermined signal processing by the communication unit 150 are performed together, predetermined adjustment is performed by the reception suppressing unit 205, and the predetermined signal processing by the communication unit 150 is subsequently terminated, the state resulting from the predetermined adjustment performed by the reception suppressing unit 205 is returned to the original state, and thus the extent of reduction in the transmission sensitivity or reception sensitivity of the first antenna unit 20 due to the adjustment can be minimized, and the terrestrial digital broadcasting can be preferably received.

Here, a method of adjusting the resonance frequency by the reception suppressing unit 205 is described with reference to a flow chart shown in FIG. 11.

In Step S11, the cellular telephone device 1 receives terrestrial digital broadcasting via the first antenna unit 20, and performs predetermined processing by the broadcast wave processing unit 101.

In Step S12, the reception suppressing unit 205 determines whether communication by the CDMA communication method is performed while receiving a channel assigned to 770 MHz of the terrestrial digital broadcasting. In a case in which it has been determined that communication by the CDMA communication method is being performed while receiving the terrestrial digital broadcasting, the processing proceeds to Step S13, or in a case in which it has been determined that communication by the CDMA communication method is not being performed at the same time while receiving the terrestrial digital broadcasting, the processing proceeds to Step S17.

Figure 12A:
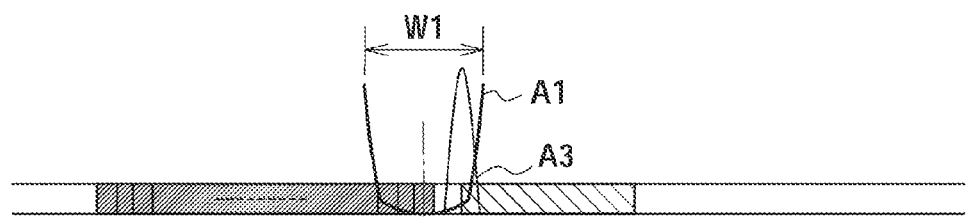
FIG. 12A is a schematic diagram showing a relationship of a resonance curve related to a first matching circuit and a resonance curve related to a second antenna unit.
Figure 12B:
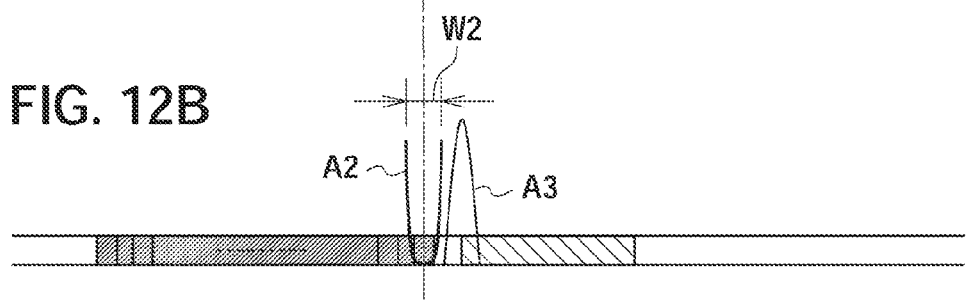
FIG. 12B is a schematic diagram showing a relationship of a resonance curve related to a second matching circuit and a resonance curve related to the second antenna unit.

In Step S13, the reception suppressing unit 205 controls to switch from the first matching circuit 103a to the second matching circuit 103b. More specifically, by switching from the first matching circuit 103a to the second matching circuit 103b, the bandwidth is changed from W1 to W2, as shown in FIG. 12A and FIG. 12B (although not shown, it should be noted that the Q-value is increased by switching from the first matching circuit 103a to the second matching circuit 103b). By doing this way, the influence from a resonance curve A3 related to the second antenna unit 151 is eliminated.

In Step S14, the reception suppressing unit 205 controls the communication processing unit 152 to perform communication by the CDMA communication method and perform predetermined processing. The communication processing unit 152 generates a transmission signal by utilizing a frequency band of 824 MHz, and outputs a transmission signal via the second antenna unit 151 to the outside.

In Step S15, the reception suppressing unit 205 determines whether communication by the CDMA communication method is terminated. In a case in which it has been determined that communication by the CDMA communication method is terminated, the processing proceeds to Step S16, or in a case in which it has been determined that communication by the CDMA communication method is not terminated, the processing returns to Step S14.

In Step S16, the reception suppressing unit 205 controls to switch from the second matching circuit 103b to the first matching circuit 103a. More specifically, by switching from the second matching circuit 103b to the first matching circuit 103a, the bandwidth is changed from W2 to W1 as shown in FIG. 12A and FIG. 12B (although not shown, it should be noted that the Q-value returns to the original value by switching from the second matching circuit 103b to the first matching circuit 103a).

In Step S17, the reception suppressing unit 205 determines whether the reception of the terrestrial digital broadcasting is continued via the first antenna unit 20. In a case in which it has been determined that the reception of the terrestrial digital broadcasting is continued, the processing returns to Step S11, or in a case in which it has determined that the reception of the terrestrial digital broadcasting is terminated, the processing is terminated.

With the reception suppressing unit 205 operating in this way, even if predetermined signal processing by the broadcast wave receiving unit 100 and predetermined signal processing by the communication unit 150 are being performed, since the control is performed to switch the first matching circuit 103a and the second matching circuit 103b as may be necessary, the terrestrial digital broadcasting can be preferably received, and communication can be performed by the CDMA communication method at the same time.

Other Embodiment 2

Moreover, the aforementioned cellular telephone device 1 has a function to shift the resonance frequency fc of the first antenna unit 20 toward the high frequency side under a controlled condition, in order to reduce deterioration of communication sensitivity (dielectric loss) due to physical contact by the user. Here, this function is implemented by the operation key set 11, the reception suppressing unit 205 and the antenna control circuit 102 operating together in a coordinated manner.

In a case in which it has been detected that an operation is being performed via the operation key set 11 while predetermined signal processing by the broadcast wave receiving unit 100 and predetermined signal processing by the communication unit 150 are being performed, the reception suppressing unit 205 narrows the bandwidth of the resonance frequency fc of the first antenna unit 20 to a constant width, and controls the antenna control circuit 102 so as to shift the resonance frequency of the first antenna unit 20 toward the high frequency side, in order to suppress the transmission signal transmitted via the second antenna unit 151 or the reception signal received via the second antenna unit 151 from being received via the first antenna unit 20.

When the user picks up and operates the cellular telephone device 1 in a hand, dielectric loss may occur, a result of which the resonance frequency may shift to the low frequency side, and the antenna characteristics of the first antenna unit 20 may be deteriorated. Particularly in a case in which the bandwidth of the resonance frequency fc of the first antenna unit 20 has been narrowed, when the resonance frequency fc shifts to the low frequency side, transmission of a transmission signal or reception of a reception signal of a desired frequency may not be appropriately performed. In such a circumstance, for example, by shifting the resonance frequency toward the high frequency side, the cellular telephone device 1 can cancel the influence due to the dielectric loss.

It should be noted that, although a case has been described in the present embodiment in which communication by the CDMA communication method is performed while preferably receiving the terrestrial digital broadcasting, the present invention is not limited thereto, and the present invention can also be applied to a case in which different communication processing is performed by utilizing different frequency bands, and when a signal is received by one antenna, a signal transmitted via another antenna is also received.

In addition, although the present embodiment is configured such that the reception suppressing unit 205 suppresses the transmission signal transmitted via the second antenna unit 151 or the reception signal received via the second antenna unit 151 from being received via the first antenna unit 20 while predetermined signal processing by the broadcast wave receiving unit 100 and predetermined signal processing by the communication unit 150 are being performed, the present invention may be configured such that the reception suppressing unit 205 suppresses the transmission signal transmitted via the first antenna unit 20 or the reception signal received via the first antenna unit 20 from being received via the second antenna unit 151.

Furthermore, although the present embodiment is configured such that the reception suppressing unit 205 suppresses the transmission signal transmitted via the second antenna unit 151 or the reception signal received via the second antenna unit 151 from being received via the first antenna unit 20 while predetermined signal processing by the broadcast wave receiving unit 100 and predetermined signal processing by the communication unit 150 are being performed, the present invention may be configured such that the reception suppressing unit 205 suppresses the transmission signal or the reception signal transmitted via the second antenna unit 151 from being received via the first antenna unit 20, or suppresses the transmission signal or the reception signal transmitted via the first antenna unit 20 from being received via the second antenna unit 151 while at least one of predetermined signal processing by the broadcast wave receiving unit 100 and predetermined signal processing by the communication unit 150 is being performed.

By doing so, while transmission of a transmission signal or reception of a reception signal of a desired frequency is being performed via one of the first antenna unit 20 and the second antenna unit 151, it is possible to beforehand reduce a possibility that communication sensitivity of one antenna may be deteriorated due to transmission of a transmission signal or reception of a reception signal performed via another antenna. This configuration is particularly effective in a case in which it is desired to preferentially improve the communication sensitivity of transmission of a transmission signal or reception of a reception signal of a desired frequency via one antenna, even though the communication sensitivity of transmission of a transmission signal or reception of a reception signal of a desired frequency via another antenna may be sacrificed to some extent (for example, during a telephone call, during transmission/reception of mail, during playing/recording of terrestrial digital broadcasting, etc.).

The invention claimed is:

1. A mobile communication device, comprising:
   a first signal processing means for performing predetermined signal processing on a transmission signal transmitted via a first antenna or a reception signal received via the first antenna;
   a second signal processing means for performing predetermined signal processing on a transmission signal transmitted via a second antenna or a reception signal received via the second antenna;
   a reception suppressing means for suppressing the transmission signal transmitted via the second antenna or the reception signal received via the second antenna from being received via the first antenna, while at least one of the predetermined signal processing by the first signal processing means and the predetermined signal processing by the second signal processing means is being performed;
   wherein, while at least one of the predetermined signal processing by the first signal processing means and the predetermined signal processing by the second signal processing means is being performed, the reception suppressing means performs adjustment such that a resonance frequency of the first antenna is shifted away from a frequency of the transmission signal transmitted via the second antenna or a frequency of the reception signal received via the second antenna, thereby suppressing the transmission signal transmitted via the second antenna or the reception signal received via the second antenna from being received via the first antenna; and wherein, in a case in which a frequency of the transmission signal transmitted via the first antenna or a frequency of the reception signal received via the first antenna is a frequency that is closer to a frequency of the transmission signal transmitted via the second antenna or a frequency of the reception signal received via the second antenna as compared to a predetermined frequency defined in advance, the reception suppressing means performs adjustment such that the resonance frequency of the first antenna is shifted away from the frequency of the transmission signal transmitted via the second antenna or the frequency of the reception signal received via the second antenna, thereby suppressing the transmission signal transmitted via the second antenna or the reception signal received via the second antenna from being received via the first antenna.

2. A mobile communication device, comprising:
a first signal processing means for performing predetermined signal processing on a transmission signal transmitted via a first antenna or a reception signal received via the first antenna;
a second signal processing means for performing predetermined signal processing on a transmission signal transmitted via a second antenna or a reception signal received via the second antenna;
a reception suppressing means for suppressing the transmission signal transmitted via the second antenna or the reception signal received via the second antenna from being received via the first antenna, while at least one of the predetermined signal processing by the first signal processing means and the predetermined signal processing by the second signal processing means is being performed;
wherein, while at least one of the predetermined signal processing by the first signal processing means and the predetermined signal processing by the second signal processing means is being performed, the reception suppressing means performs adjustment such that a resonance frequency of the first antenna is shifted away from a frequency of the transmission signal transmitted via the second antenna or a frequency of the reception signal received via the second antenna, thereby suppressing the transmission signal transmitted via the second antenna or the reception signal received via the second antenna from being received via the first antenna; and
wherein, in a case in which intensity of a transmission signal transmitted via the second antenna or intensity of a reception signal received via the second antenna is higher than a predetermined intensity defined in advance, the reception suppressing means performs adjustment such that the resonance frequency of the first antenna is shifted away from the frequency of the transmission signal transmitted via the second antenna or the frequency of the reception signal received via the second antenna, thereby suppressing the transmission signal transmitted via the second antenna or the reception signal received via the second antenna from being received via the first antenna.

3. A mobile communication device, comprising:
a first signal processing means for performing predetermined signal processing on a transmission signal transmitted via a first antenna or a reception signal received via the first antenna;
a second signal processing means for performing predetermined signal processing on a transmission signal transmitted via a second antenna or a reception signal received via the second antenna;
a reception suppressing means for suppressing the transmission signal transmitted via the second antenna or the reception signal received via the second antenna from being received via the first antenna, while at least one of the predetermined signal processing by the first signal processing means and the predetermined signal processing by the second signal processing means is being performed;
wherein, while at least one of the predetermined signal processing by the first signal processing means and the predetermined signal processing by the second signal processing means is being performed, the reception suppressing means performs adjustment such that a resonance frequency of the first antenna is shifted away from a frequency of the transmission signal transmitted via the second antenna or a frequency of the reception signal received via the second antenna, thereby suppressing the transmission signal transmitted via the second antenna or the reception signal received via the second antenna from being received via the first antenna; and
wherein, in a case in which the signal processing by the second signal processing means is terminated after performing the adjustment such that the resonance frequency of the first antenna is shifted away from the frequency of the transmission signal transmitted via the second antenna or the frequency of the reception signal received via the second antenna, the reception suppressing means returns the resonance frequency of the first antenna to a state before the adjustment.

4. A mobile communication device, comprising:
a first signal processing means for performing predetermined signal processing on a transmission signal transmitted via a first antenna or a reception signal received via the first antenna;
a second signal processing means for performing predetermined signal processing on a transmission signal transmitted via a second antenna or a reception signal received via the second antenna; and
a reception suppressing means for suppressing the transmission signal transmitted via the second antenna or the reception signal received via the second antenna from being received via the first antenna, while at least one of the predetermined signal processing by the first signal processing means and the predetermined signal processing by the second signal processing means is being performed;
wherein, while at least one of the predetermined signal processing by the first signal processing means and the predetermined signal processing by the second signal processing means is being performed, the reception suppressing means narrows a bandwidth of a resonance frequency of the first antenna, thereby suppressing the transmission signal transmitted via the second antenna or the reception signal received via the second antenna from being received via the first antenna;
wherein, in a case in which a frequency of the transmission signal transmitted via the first antenna or a frequency of the reception signal received via the first antenna is a frequency that is closer to a frequency of the transmission signal transmitted via the second antenna or a frequency of the reception signal received via the second antenna as compared to a predetermined frequency defined in advance, the reception suppressing means narrows the bandwidth of the resonance frequency of the first antenna, thereby suppressing the transmission signal transmitted via the second antenna or the reception signal received via the second antenna from being received via the first antenna.

5. A mobile communication device, comprising:

a first signal processing means for performing predetermined signal processing on a transmission signal transmitted via a first antenna or a reception signal received via the first antenna;

a second signal processing means for performing predetermined signal processing on a transmission signal transmitted via a second antenna or a reception signal received via the second antenna; and a reception suppressing means for suppressing the transmission signal transmitted via the second antenna or the reception signal received via the second antenna from being received via the first antenna, while at least one of the predetermined signal processing by the first signal processing means and the predetermined signal processing by the second signal processing means is being performed;

wherein, while at least one of the predetermined signal processing by the first signal processing means and the predetermined signal processing by the second signal processing means is being performed, the reception suppressing means narrows a bandwidth of a resonance frequency of the first antenna, thereby suppressing the transmission signal transmitted via the second antenna or the reception signal received via the second antenna from being received via the first antenna;

wherein, in a case in which intensity of a transmission signal transmitted via the second antenna or intensity of a reception signal received via the second antenna is higher than a predetermined intensity defined in advance, the reception suppressing means narrows the bandwidth of the resonance frequency of the first antenna, thereby suppressing the transmission signal transmitted via the second antenna or the reception signal received via the second antenna from being received via the first antenna.

6. A mobile communication device, comprising:

a first signal processing means for performing predetermined signal processing on a transmission signal transmitted via a first antenna or a reception signal received via the first antenna;

a second signal processing means for performing predetermined signal processing on a transmission signal transmitted via a second antenna or a reception signal received via the second antenna; and a reception suppressing means for suppressing the transmission signal transmitted via the second antenna or the reception signal received via the second antenna from being received via the first antenna, while at least one of the predetermined signal processing by the first signal processing means and the predetermined signal processing by the second signal processing means is being performed;

wherein, while at least one of the predetermined signal processing by the first signal processing means and the predetermined signal processing by the second signal processing means is being performed, the reception suppressing means narrows a bandwidth of a resonance frequency of the first antenna, thereby suppressing the transmission signal transmitted via the second antenna or the reception signal received via the second antenna from being received via the first antenna;

wherein, in a case in which the predetermined signal processing by the second signal processing means has been terminated after the reception suppressing means narrows the bandwidth of the resonance frequency of the first antenna while at least one of the predetermined signal processing by the first signal processing means and the predetermined signal processing by the second signal processing means is being performed, the reception suppressing means returns the bandwidth of the resonance frequency of the first antenna to a state before being narrowed to a certain width.

* * * * *